United States Patent
Yoon et al.

(10) Patent No.: US 10,818,953 B2
(45) Date of Patent: *Oct. 27, 2020

(54) CARBON DIOXIDE TRAPPING DEVICE AND METHOD CAPABLE OF PRODUCING ELECTRICITY

(71) Applicant: Korea Institute of Energy Research, Daejeon (KR)

(72) Inventors: Yeo Il Yoon, Daejeon (KR); Han Ki Kim, Jeju-si (KR); Sung Chan Nam, Daejeon (KR); Chan Soo Kim, Seoul (KR); Sung Youl Park, Daejeon (KR); Nam Jo Jeong, Jeju-si (KR); Young Eun Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 589 days.

This patent is subject to a terminal disclaimer.

(21) Appl. No.: 15/115,980

(22) PCT Filed: Feb. 3, 2015

(86) PCT No.: PCT/KR2015/001096
§ 371 (c)(1),
(2) Date: May 9, 2017

(87) PCT Pub. No.: WO2015/115874
PCT Pub. Date: Aug. 6, 2015

(65) Prior Publication Data
US 2017/0256812 A1  Sep. 7, 2017

(30) Foreign Application Priority Data
Feb. 3, 2014 (KR) .................. 10-2014-0012302

(51) Int. Cl.
*H01M 8/22* (2006.01)
*B01D 53/14* (2006.01)
(Continued)

(52) U.S. Cl.
CPC ........ *H01M 8/227* (2013.01); *B01D 53/1425* (2013.01); *B01D 53/1475* (2013.01);
(Continued)

(58) Field of Classification Search
CPC . H01M 8/227; H01M 8/04007; H01M 8/1004
See application file for complete search history.

(56) References Cited

U.S. PATENT DOCUMENTS

2014/0004403 A1* 1/2014 Yan .................... H01M 8/20
429/107

FOREIGN PATENT DOCUMENTS

CN  103405994 A  * 11/2013
CN  103521053 A  *  1/2014
(Continued)

OTHER PUBLICATIONS

International Search Report dated Mar. 9, 2015 in International Application No. PCT/KR2015/001096.
(Continued)

*Primary Examiner* — Zhongqing Wei
(74) *Attorney, Agent, or Firm* — Panitch Schwarze Belisario & Nadel LLP

(57) ABSTRACT

An apparatus and process are provided for electricity production and high-efficiency trapping of carbon dioxide, using carbon dioxide within combustion exhaust gas and converging technologies associated with a carbon dioxide absorption tower and a generating device using ions which uses a difference in concentration of salinity between seawater and freshwater. It is expected that enhanced electrical energy production efficiency, an effect of reducing costs for
(Continued)

the operation of a carbon dioxide trapping process, and electricity production from carbon dioxide, which is a greenhouse gas, can be simultaneously achieved by increasing the difference in concentration using an absorbent for absorbing carbon dioxide.

6 Claims, 3 Drawing Sheets

(51) Int. Cl.
  *B01D 53/62* (2006.01)
  *B01D 53/73* (2006.01)
  *B01D 53/78* (2006.01)
  *H01M 8/04007* (2016.01)
  *H01M 8/1004* (2016.01)
  *B01D 53/96* (2006.01)
  *H01M 8/06* (2016.01)
  *H01M 8/04029* (2016.01)

(52) U.S. Cl.
  CPC ............ *B01D 53/62* (2013.01); *B01D 53/73* (2013.01); *B01D 53/78* (2013.01); *B01D 53/965* (2013.01); *H01M 8/04007* (2013.01); *H01M 8/0693* (2013.01); *H01M 8/1004* (2013.01); *B01D 2251/30* (2013.01); *B01D 2251/60* (2013.01); *B01D 2251/604* (2013.01); *B01D 2251/606* (2013.01); *B01D 2251/61* (2013.01); *B01D 2252/10* (2013.01); *B01D 2252/103* (2013.01); *B01D 2252/204* (2013.01); *B01D 2252/205* (2013.01); *B01D 2252/60* (2013.01); *B01D 2252/606* (2013.01); *B01D 2252/608* (2013.01); *B01D 2258/0283* (2013.01); *H01M 8/04029* (2013.01); *Y02A 50/20* (2018.01); *Y02C 20/40* (2020.08)

(56) References Cited

FOREIGN PATENT DOCUMENTS

| | | |
|---|---|---|
| JP | 2012076065 A | 4/2012 |
| KR | 20100036430 A | 4/2010 |
| KR | 20120025679 A | 3/2012 |
| KR | 101311360 B1 | 10/2013 |

OTHER PUBLICATIONS

Decision to Grant (Korean language) dated Jul. 23, 2015 in KR Application No. 10-2014-0012302.

\* cited by examiner

[FIG 1]
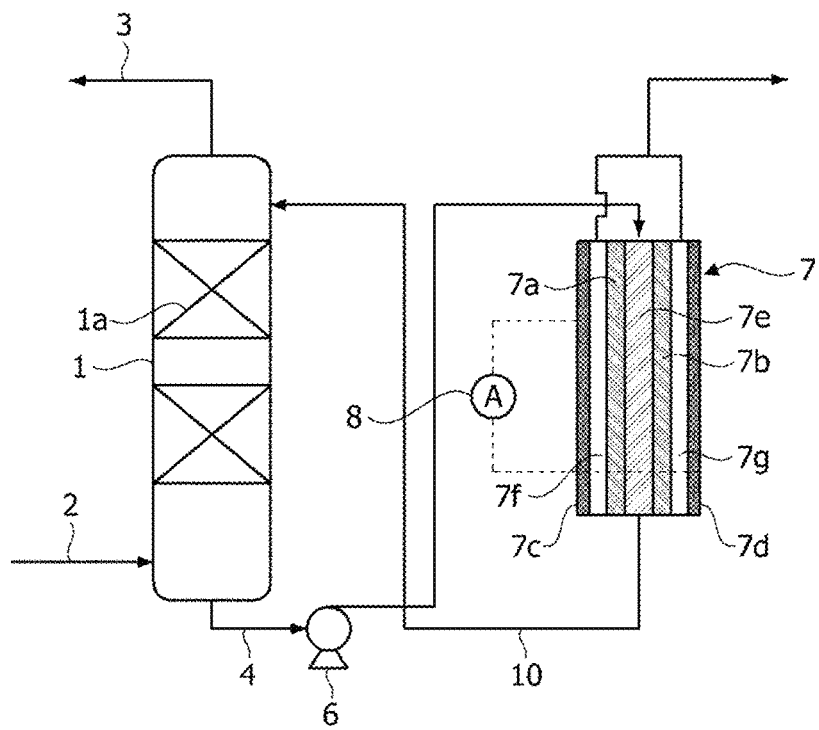
[Fig 2]
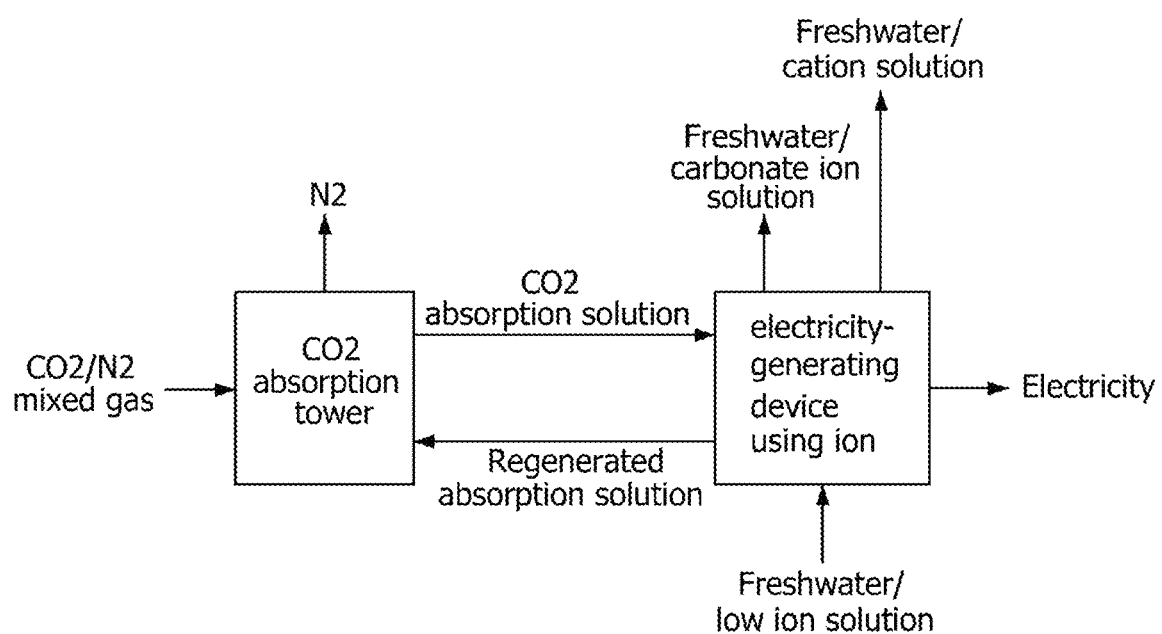

[FIG 3]
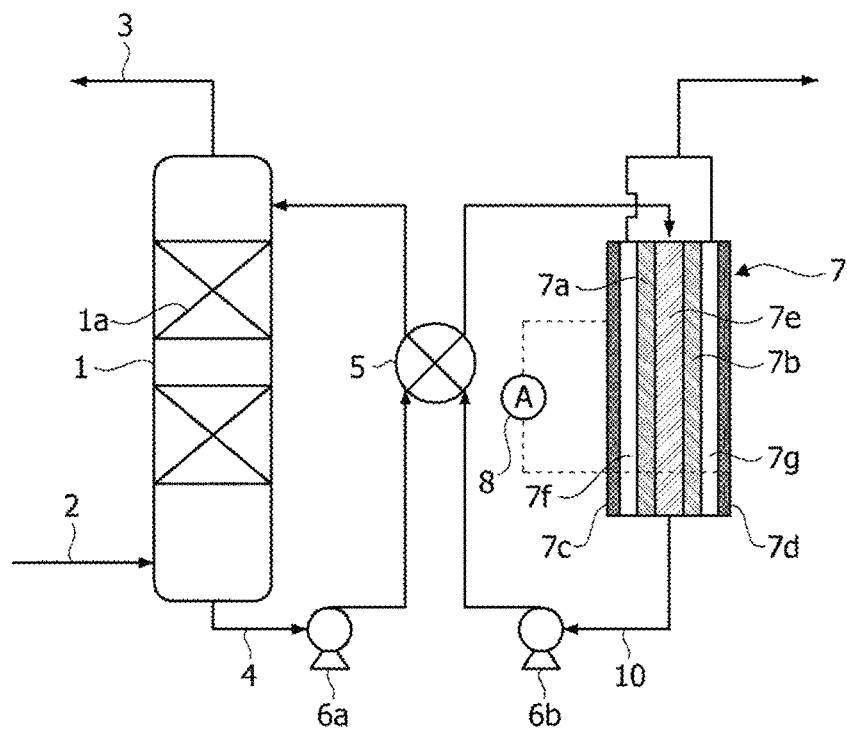
[FIG 4]
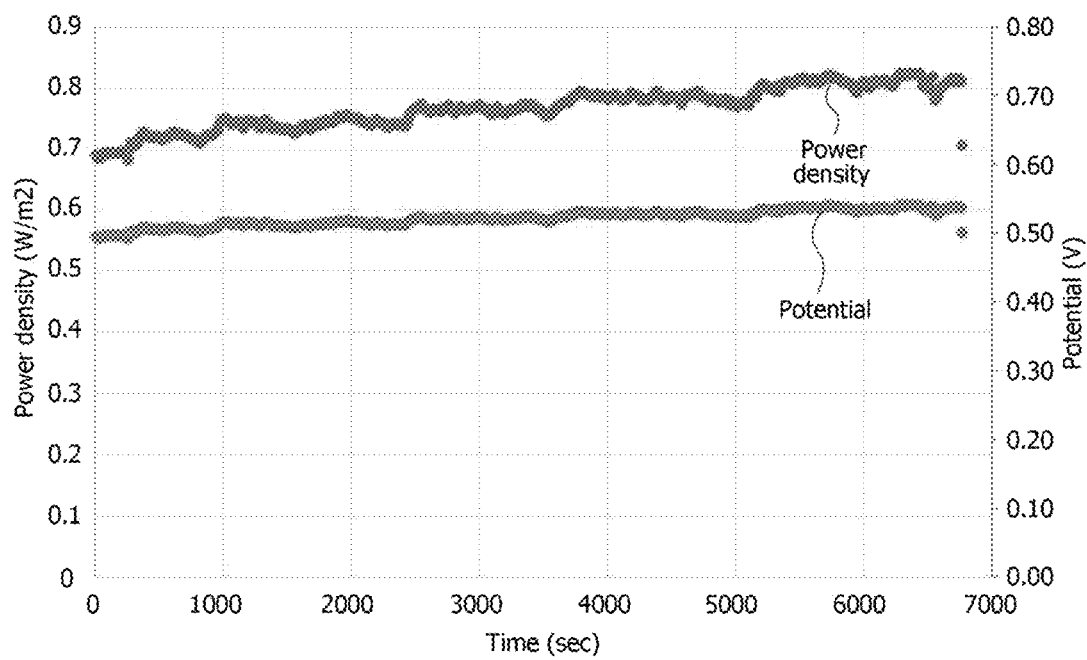

[FIG 5]

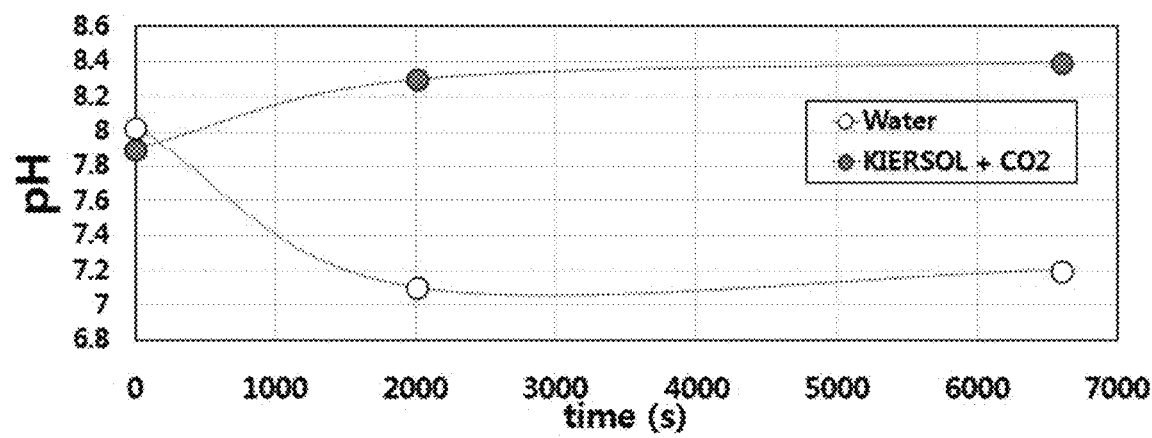

[FIG 6]

| No. | | Power density (W/m² of membrane) | Potential (V) | pH in KIERSOL | pH out KIERSOL | pH out water |
|---|---|---|---|---|---|---|
| 1 | KIERSOL | water | 0.3~0.4 | 0.3~0.4 | 13.1 | 13.8 | 11.5 |
| 2 | KIERSOL+CO₂ | water | 0.7~0.8 | 0.5 | 8.15 | 7.3 | 6.9 |

*Conditions:
- Membranes : Fumatech membranes (AEM, CEM)
- Electrode : Graphite electrodes (Anode, Cathode)
- Stacked numbers : 5 stacked
- Spacer thickness : 0.2mm
- Effective area per membrane : 0.0071m²
- Flow rate : 10 mL/min (Saline water), 5 mL/min (Fresh water), 10 mL/min (Electrode solution)

CARBON DIOXIDE TRAPPING DEVICE AND METHOD CAPABLE OF PRODUCING ELECTRICITY

CROSS-REFERENCE TO RELATED APPLICATION

This application is a Section 371 of International Application No. PCT/KR2015/001096, filed Feb. 3, 2015, which was published in the Korean language on Aug. 6, 2015, under International Publication No. WO 2015/115874 A1, and the disclosure of which is incorporated herein by reference.

TECHNICAL FIELD

The present invention relates to an apparatus and process for capturing carbon dioxide from among various types of combustion exhaust gases, and more particularly, an apparatus and process for producing electricity and capturing carbon dioxide with high efficiency using carbon dioxide within combustion exhaust gases as a result of applying converging technologies associated with a carbon dioxide absorption tower and an electricity-generating device using ion.

BACKGROUND ART

Carbon dioxide, which is the most abundant of the six major greenhouse gases causing global warming, is an acidic gas, and there are restrictions on the number of facilities permitted to discharge carbon dioxide in large quantities. Carbon dioxide is generated by burning fossil fuels and thus is mainly generated in industrial processes in which energy is generated or consumed in large quantities. According to a strategy for actively responding to climate changes proposed by the International Energy Agency in 2012, it is expected that carbon dioxide, which needs to be reduced by about 22% by 2050 in order for human beings to survive, will be reduced using carbon capture and sequestration (CCS) technology. CCS technology will also need to be procured domestically in order to reduce by 2020 the expected quantity of greenhouse gas emissions or the 2020 Business as Usual (BAU) scenario by 30%.

Among the three steps of capture/compression, transport, and sequestration of carbon dioxide that make up CCS technology, the method of capturing carbon dioxide is the most costly and thus has received the greatest focus in terms of their technical development. Several techniques for capturing carbon dioxide have been developed since the 1900's, some of which have been commercialized. Analysis results show that carbon dioxide can now be captured in large quantities, and the most economical methods for this are the liquid absorption methods. The liquid absorption methods are mainly divided into physical absorption methods and chemical absorption methods, and the commercially available chemical absorption method associated with the present invention is described in Table 1.

TABLE 1

| Product name | | Chemical solvent used | Process conditions |
|---|---|---|---|
| Chemical solvents | MEA | 2,5n monoethanol amine and inhibitors | 40° C., ambient intermediate pressures |
| | Amine guard | 5n monoethanol amine and inhibitors | 40° C., ambient intermediate pressures |
| | Econamine | 6n diglycol amine | 80 to 120° C., 6.3 MPa |

TABLE 1-continued

| Product name | Chemical solvent used | Process conditions |
|---|---|---|
| ADIP | 2-4n diisopropanol amine 2n methyldiethanol amine | 35 to 40° C., > 0.1 MPa |
| a-Meda | 2n methydiethanol amine | |
| Flexsorb | Hindered amine | |
| KS-1, KS-2, KS-3 | Hindered amine and promoters | |
| Benefield and versions | Potassium carbonate and catalysts. Lurgi & Catacarb processes with arsenic trioxide | 70 to 120° C., 2 to 2.7 MPa |

The most commonly used liquid absorption methods include an alkanolamine method (in which monoethanolamine, diethanolamine, triethanolamine, etc. are used) and a Benfield method in which potassium carbonate is used. The alkanolamine method involves utilizing various types of alkanolamines, which are mixed with water to prepare a 20 to 30 wt % solution, that absorb carbon dioxide, and because of its rapid rate of carbon dioxide absorption, the alkanolamine method has been available for commercial use since the 1970's.

According to the alkanolamine method, a regeneration reaction requires injection of a very high amount of heat energy at the time that the regeneration reaction is performed after a carbamate is formed by combining an alkanolamine and carbon dioxide. Therefore, due to the high amounts of energy needed in order to regenerate absorbents in these conventional amine-based absorption processes, there has been a demand for the reduction of capturing costs.

In terms of another absorbent for capturing carbon dioxide and the related process technology, a potassium carbonate-based liquid absorbent for capturing carbon dioxide (named KIERSOL, Registered Trademark Nos. 40-2011-0046524 and 40-2011-0046525) and the related process technology in Korean Patent No. 1157141, Korean Patent No. 1316543, Korean Patent No. 123938, and the like were independently developed. In a process using this absorbent, the energy consumed to regenerate the absorbent is about 2.5 GJ/$tCO_2$, which is at least 20% lower than that of the KS-1 process of Mitsubishi Heavy Industries. LTD (MHI), who currently possesses the best technology in the world (regeneration energy: 3.2 GJ/$tCO_2$). Also, since this absorbent is influenced less by sulfur oxide or halogen compounds included in small amounts in the combustion exhaust gas, it is possible for the absorbent to compensate for shortcomings of existing absorbents, such as the need to continuously supplement an absorbent during operation of the process, and to reduce operation costs.

In addition, in order to solve problems of water shortage and energy depletion caused by global warming, studies on methods of desalinating seawater, which accounts for most of the water on the Earth's surface, have been conducted. Distillation used in the Middle East and reverse osmosis widely used in the US, Japan, etc. are representative methods. However, reverse osmosis also consumes large amounts of energy because it involves using a high-pressure pump to obtain the water. In order to address this problem, devices for recovering energy from high-pressure concentrated water have been developed. Using a system similar to forward osmosis (FO) through which energy consumption can be dramatically reduced, pressure retarded osmosis (PRO) known as energy generation technology, and electrodialysis (ED) in which anion exchange membranes and cation exchange membranes are installed alternately between negative electrodes and positive electrodes, in which a system that is the same as the forward osmosis (FO) method in which the two flows of the supply flow and the discharge flow fill the space between the ion exchange membranes with seawater and river water, and electrons are transferred from the negative electrodes to the positive electrodes based on movement of ions due to a difference in voltage generated by a difference in salinity between the seawater and the river water as technology for producing electricity has been studied by Dr. Braun's team in Belgium, Dr. Hameler's team in the Netherlands, and the like.

Dr. Hameler's team reported that mixing energy is discharged when two fluids having different compositions are mixed, and that although there is no technology available for obtaining this energy from gases and liquids, if carbon dioxide mixed with combustion gas in the air is regarded as an energy source, 1570 TWh of energy is available annually around the world. They also reported that in order to obtain mixing energy from discharged gases including carbon dioxide, if a pair of porous electrodes including an anion-selective electrode and a cation-selective electrode are used, electric energy can be obtained between the selective porous electrodes when a flushed electrolyte is allowed to flow alternately along with carbon dioxide or air. In addition, they reported that efficiency rate of this process is 24% when the electrolyte is non-ionized water and is 32% when the electrolyte is 0.25 M MEA. An amount of the maximum average energy is 4.5 mW/m$^2$ when the MEA solution is used as the electrolyte, which is remarkably higher than 0.28 mW/m$^2$ when water is used as the electrolyte.

When two solutions having different compositions are mixed, a mixture having lower Gibbs free energy content than that of either of the original solutions is obtained. This decrease in the Gibbs free energy amount suggests that it is possible to obtain mixing energy using the appropriate technology. In the mixing processes for obtaining energy resources that have been developed so far, only aqueous solutions differing in salinity are mixed. It is reported that a maximum of about 3 kJ of energy per liter of freshwater can typically be used when seawater and freshwater from a stream are mixed. In order to use this energy resource, several technologies applying semipermeable membranes, ion-selective membranes, double-layer expansion, ion-selective porous electrodes, and the like have been developed. Technology in which ion-selective porous electrodes are applied is based on the use of a pair of capacitive electrode cells similar to the electrodes used in capacitive deionization (CDI) for desalination or those used in a supercapacitor. In another approach, a fuel cell with dry air in a negative electrode may also be used in order to maintain operation when using an electrochemical concentration cell.

In addition, researchers have investigated the possibility of obtaining energy from the emission of carbon dioxide. At places in which hydrocarbon fuel or biomass is combusted, that is, places in which hydrocarbon fuel or biomass is converted to carbon dioxide and water, exhaust gas containing concentrations of carbon dioxide (5 to 20%) higher than air (0.039%) is produced, which means that combustion gas mixed with air is an energy source which is not being used at the present time. In order to exploit this energy source, researchers have suggested contact between emission of carbon dioxide and air having an aqueous electrolyte. In an aqueous solution, carbon dioxide is dissociated into protons (W) and bicarbonate ions ($HCO_3^-$) to form carbonic acid, and the bicarbonate ions ($HCO_3^-$) may be further dissociated into carbonate ions ($CO_3^{2-}$) in a high pH condition. In a gas, an increase in a pressure of carbon dioxide causes an increase in an ion concentration in an aqueous solution, and as a result, a difference in an ion concentration between a solution into which air is injected and a solution into which carbon dioxide is injected may be used to obtain electric energy. Here, the researchers reported that they have addressed the feasibility of obtaining additional energy from the mixing of carbon dioxide and air.

In an experimental installation configured of two tanks containing electrolytes, air was input into one tank and carbon dioxide of 100% purity are input into the other tank. Each of the tanks is connected to a capacitive cell by a peristaltic pump. Both pumps, T connectors, and valves are configured to prevent backflow, a pH probe is installed in the inlet of a capacitive cell, and the discharge openings of the two pumps were under the condition of an open circuit or closed circuit due to an external load, and cell potential is measured by a multimeter, which comprises an anion exchange electrode that is connected to the ground of the multimeter. In a capacitive cell composed of two capacitive electrodes, one is covered with a cation exchange membrane (CEM) and the other is covered with an anion exchange membrane (AEM). A cell used in the experiment is formed by stacking a plurality of layers so that an even flow passes through the cell, and is composed of (1) an aluminum plate used as an exterior plate, (2) a graphite plate socket having a hollow poly(methyl methacrylate) (PMMA) plate used as a current collector, (3) a silicone gasket for sealing the cell and forming a space for the capacitive electrodes, (4) the capacitive electrodes made of a graphite foil current collector on which an activated carbon layer is coated, (5) a CEM selective to cations (protons), (6) a Teflon gasket for forming a space for a spacer, (7) a polymer spacer for forming a membrane and flow of a fluid, and (8) an anion exchange membrane layer selective to anions (bicarbonate ions).

A porous carbon electrode was prepared by mixing activated carbon powder in a binder solution, and was pretreated by being immersed in a carbon dioxide-containing solution or a MEA solution. An anion membrane and a cation membrane were immersed in a 0.25 M hydrochloric acid solution in the case of the CEM and in a 0.25 M potassium bicarbonate ($KHCO_3$) solution in the case of the AEM for 24 hours, during which an immersion solution was replaced two times. A polymer spacer was used to form a flow path.

The two solutions were supplied to a pump through a spacer channel between the two ion exchange membranes, and the flow of water into which carbon dioxide was injected, which passed through the device in all experiments, was supplied alternately along with flow of water into which air was injected. These two steps constituted a single cycle. Water was dissociated from different salts, the temperature was 20° C., and the device was operated at atmospheric pressure. It is possible to generate electricity by connecting the two electrodes through external load resistance ($R_{ext}$) to allow electrons to flow between the two electrodes, and electrons move from the anion selective electrode to the cation selective electrode due to the membrane potential when exposed to the water into which carbon dioxide is injected. This movement of electric charges causes excess charges at each electrode, and these excess charges are offset by absorbing counterions at the surfaces of the electrodes until the membrane potential and the double layer potential reach equilibrium and the cell voltage becomes 0 in order to maintain electroneutrality. When the solution into which carbon dioxide is injected is replaced with the solution into which air is injected, the new membrane potential reverses this process. In this case, ions are discharged from the electrode and then return to the flowing solution between the time at which the cell potential returns to 0 and the time at which the cell potential reaches the new equilibrium. This cell potential of 0 is typical in an energy generation mode of cell operation, but there is no movement of charges under a condition of an open circuit. Therefore, the electrode double-layer potential is unlikely to be in equilibrium with the membrane potential. As a result, the potential will be changed only through a change in the membrane potential. However, since electrode potential remains constant, it will be necessary to verify that the cell potential reaches 0. The cycle may be repeated by alternately supplying the two solutions.

The solutions into which air and carbon dioxide are injected were both prepared by a method of spraying gas, which is a simple technique that is easy to apply in a laboratory. However, spraying is an energy intensive process that has been widely studied with respect to wastewater treatment. Specific aeration efficiency is influenced by applied technology and is in a range of 0.6 to 7.5 $kgO_2/kWh$. Even if the most efficient aeration technology available is used, researchers generally assume that about 300 $kJ/kgCO_2$ is required for a single solution. This calculation shows that when spraying is used to bring an electrolyte and a gas in contact with each other, the energy used is greater than that produced. A research team experimentally proved a principle related to a method for obtaining electric energy by configuring an electricity-generating device using ion in which dissolved carbon dioxide is dissociated into protons and a bicarbonate and then diffused to a different electrode due to ion selectivity, and as a result, current is produced spontaneously by the obtained membrane potential.

Research using PRO in which electricity is generated by generating osmotic pressure 26 times higher than atmospheric pressure by using a concentration difference to pass freshwater toward seawater through a semipermeable membrane installed therebetween and reverseelectrodialysis (RED) in which only specific ions selectively pass through a membrane has been conducted as seen in Korean Patent No. 131136, Korean Patent No. 1291768, and Korean Patent No. 1318331.

However, research on production of electricity by using a carbon dioxide absorption tower to apply an absorption solution, in which carbon dioxide included in a combustion gas is absorbed, to an electricity-generating device using ion using seawater and freshwater has been not attempted.

At the present, in the case of process technology for capturing carbon dioxide, technology development has focused on improvements in material performance and process efficiency for the past 40 years in order to reduce the energy necessary for regenerating chemical materials, and in the case of ion generating technology using a salinity difference, improvement of membrane performance and a membrane module system has been focused on in order to overcome the limitation on the amount of electricity that is generated with the low salinity of seawater (3.5%). To address the difficulty of developing these technologies, processes of capturing carbon dioxide are operated through a combination of technology for capturing carbon dioxide and technology for generating ion utilizing a difference in salinity. In this case, heat energy necessary for regeneration is not required but a carbon dioxide absorption solution actually becomes a base material for generation, and a high amount of current is obtained based on a large difference in salt concentration. Therefore, it is thought that when these two problems are dramatically solved, a technical paradigm for solving global warming will be achieved.

DISCLOSURE

Technical Problem

The present invention is designed for the aforementioned research. An object of the present invention is to provide an apparatus and process for capturing carbon dioxide with high efficiency, in which a carbon dioxide capturing process and technology related to an electricity-generating device using ion using seawater and freshwater can be applicable towards producing electrical energy without requiring additional energy for regenerating a saturated absorbent to stably operate a liquid absorption process for capturing carbon dioxide.

Technical Solution

To achieve the goal, the present invention provides an apparatus and process for carbon dioxide capture related to generate electricity, wherein the apparatus includes an absorption tower 1 in which a gas including carbon dioxide comes in contact with an absorbent and is absorbed by the absorbent; and an electricity-generating device using ion 7 including a fluid solution flow path which contains a first flow path 7f and a second flow path 7g through which a fluid solution moves; and an absorption solution flow path 7e through which an absorption solution that has absorbed carbon dioxide moves between the first flow path and the second flow path; wherein electricity is generated by a potential difference generated by a concentration difference between the absorption solution that has absorbed carbon dioxide and the fluid solution; wherein a regenerated absorption solution moving through the absorption solution flow path and passing through the electricity-generating device using ion forms a closed loop and is supplied to the absorption tower by a liquid transfer pump 6.

The device may include a cation exchange membrane 7a formed between the first flow path and the absorption solution flow path, and an anion exchange membrane 7b formed between the second flow path and the absorption solution flow path.

The device may include a cation electrode 7c spaced apart from the cation exchange membrane and disposed to face the cation exchange membrane and an anion electrode 7d spaced apart from the anion exchange membrane and disposed to face the anion exchange membrane.

The absorbent may include, as a solute, one or more selected from among aqueous electrolytes such as amines, alkali metal bicarbonates, alkali carbonates, carbonates, hydroxides, borates, phosphates, nitrates, acids, and sodium chloride and organic electrolytes such as propylene carbonate (PC), diethyl carbonate (DEC), and tetrahydrofuran (THF).

The amines may be primary amines, secondary amines, and ammonia. These amines may be liquid or solid at room temperature and atmospheric pressure, or may be gases with vapor pressure or in a mist-phase. Primary amines may be saturated aliphatic primary amines such as methylamine, ethylamine, isopropylamine, propylamine, butylamine, 2-aminoethanol, and the like, unsaturated aliphatic primary amines such as allylamine and the like, alicyclic primary amines such as cyclopropylamine and the like, and aromatic primary amines such as aniline and the like. Secondary amines may be saturated aliphatic secondary amines such as dimethylamine, diethylamine, diisopropylamine, and the like, unsaturated aliphatic secondary amines such as diallylamine and the like, and aromatic secondary amines such as methylaniline and the like.

Also, the amines may be ethyleneamine, ethanolamine (MEA), N—N-butylethanolamine (BEA), ethylenediamine (EDA), diethanolamine (DEA), diisopropanolamine (DIPA), N-methyldiethanolamine (MDEA), diglycol amine (DGA), triethanolamine (TEA), o-methylhydroxylamine, ethanimidamine, N-(2-hydroxyethyl)ethylenediamine (AEEA), diethanoltriamine (DETA), N,N-dimethylethlethanolamine (DMMEA), 2-4n diisopropanolamine or 2n methyldiethanolamine (ADIP), piperidine, piperazine, morpholine, pyrrolidine, 2,2,6,6-tetramethyl-4-piperidinol (TMP), 2-amino-2-methylpropanol (AMP), 1-amino-2-propanol (MIPA), 2-methylaminoethanol (MMEA), 3-amino-1-propanol (MPA), diethylaminoethanol (DEMEA), 2-diisopropylaminoethanol (DIPMEA), 2-diethylaminoethanol (DEAE), 2-(diisopropylamino)ethanol (DIPAE), 2-(dimethylamino)-2-methylpropanol (DMAMP), N-ethyldiethanolamine (EDEA), N-isopropyldiethanolamine (IPDEA), N-tert-butyldiethanolamine (tBDEA), 1-(2-hydroxyethyl)pyrrolidine (HEP), 1-(2-hydroxyethyl)piperidine (HEPD), 1-methyl-2-piperidineethanol (1M-2PPE), 1-ethyl-3-hydroxypiperidine (1E-3HPP), 2-{[2-(dimethylamino)ethyl]methylamino}ethanol (DMAEMAE), N,N,N',N'-tetrakis(2-hydroxyethyl)ethylenediamine (TKHEEDA), 2-[2-(dimethylamino)ethoxy]ethanol (DMAEE), bis[2-(N,N-dimethylamino)ethyl]ether (DAEE), 1,4-dimethylpiperazine (DMPZ), N,N,N',N'',N''-pentamethyldiethylenetriamine (PMDETA), N-methyl-N,N-bis[3-(dimethylamino)propyl]amine (PMDPTA), n-butyl di ethanol amine (BDEA), tri-isopropanolamine (TIPA), 4-(2-hydroxyethyl)morpholine (HEM), hydroxyisopropylmorpholine(N-(2-hydroxypropyl) morpholine) (HIPM), (2-(dibutylamino)ethanol (2-DBAE), 2,2-bis(hydroxymethyl)-2,2'2''-nitrilotriethanol (HMNTE), N-methyl-4-piperidinol (MP), hexamethylenetetramine (HMTA), N,N-dicyclohexylmethylamine (DCHMA) and the like.

In addition, the amines may be the sterically hindered amines KS-1, KS-2, and KS-3. Also, sterically hindered cyclic amines may be 1-amino-4-methylpiperazine, 1-(2-aminoethyl)-4-methylpiperazine, 1-(2-hydroxyethyl)-4-methylpiperazine, 1-(2-aminoethyl)piperazine, 1-(2-hydroxyethyl)piperazine, 2-aminoethylpiperazine, 1-ethylpiperazine, 2,5-dimethylpiperazine, cis-2,6-dimethylpiperazine, 1,4-dimethylpiperazine, trans-2,5-dimethylpiperazine, 1-methylpiperazine, 2-methylpiperazine, 1-ethylpiperazine, 2-piperidineethanol, 3-piperidineethanol, 4-piperidineethanol, 2-aminoethyl-1-piperidine, homopiperazine, and the like.

The alkali carbonates may include potassium carbonate ($K_2CO_3$), sodium carbonate ($Na_2CO_3$), sodium hydroxide (NaOH), potassium hydroxide (KOH), potassium bicarbonate ($KHCO_3$), sodium bicarbonate ($NaHCO_3$), and the like. Also, the alkali carbonates may include compounds from the Benfield process developed by Union Carbide Corporation, the HIPure process known as the improved Benfield process, the Catacarb process developed by A. G. Eickmeyer, FLEXSORB HP developed by Exxon mobil Corporation, etc.

In addition, the nitrate may be sodium nitrate ($NaNO_3$). Also, the acid may be sulfuric acid ($H_2SO_4$) or hydrochloric acid (HCl).

The absorbent may further include, as an additive, a corrosion inhibitor, a coagulant aid, an antioxidant, an oxygen scavenger, an antifoaming agent, or a combination thereof.

The absorbent may include, as a solvent, one or more selected from among aqueous solvents such as pure water, freshwater, brackish water, saline water, all of which are forms in which water is present, and a mixed solvent of an alcohol and water or organic solvents including aliphatic hydrocarbons such as hexane and the like; aromatic hydrocarbons such as benzene, toluene, xylene, methylnaphthalene, and the like; heterocyclic compounds such as quinoline, pyridine, and the like; ketones such as acetone, methyl ethyl ketone, cyclohexanone, and the like; esters such as methyl acetate, methyl acrylate, and the like; amines such as diethylenetriamine, N,N-dimethylaminopropylamine, and the like; ethers such as diethyl ether, propylene oxide, tetrahydrofuran (THF), and the like; amides such as N-methylpyrrolidone (NMP), dimethylformamide, dimethylacetamide, and the like; and polar aprotic solvents such as hexamethylphosphoramide, dimethyl sulfoxide, and the like.

The solvent may be used without particular limitation as long as the solute can be dissolved or dispersed in the solvent, and either aqueous solvents or organic solvents may be used.

The aqueous solvents may be, for example, pure water, freshwater, brackish water, saline water, all of which are forms in which water is present, or a mixed solvent of an alcohol and water.

Here, of water present in nature, seawater or water of a saltwater lake is saline water, and typical inland water is freshwater. Inland water is distinct from pure water because inland water not is not comprised of pure $H_2O$ but contains some salinity. A content of salinity increases in the order of freshwater, brackish water, and saline water. Brackish water refers to water in which seawater and freshwater are mixed in a lake or an inlet on a coast, and refers to an intermediate between seawater and freshwater in terms of salt concentration.

The organic solvents may be, for example, aliphatic hydrocarbons such as hexane and the like; aromatic hydrocarbons such as benzene, toluene, xylene, methylnaphthalene and the like; heterocyclic compounds such as quinoline, pyridine and the like; ketones such as acetone, methyl ethyl ketone, cyclohexanone and the like; esters such as methyl acetate, methyl acrylate and the like; amines such as diethylenetriamine, N,N-dimethylaminopropylamine and the like; ethers such as diethyl ether, propylene oxide, tetrahydrofuran (THF) and the like; amides such as N-methylpyrrolidone (NMP), dimethylformamide, dimethylacetamide and the like; and polar aprotic solvents such as hexamethylphosphoramide, dimethyl sulfoxide and the like.

The absorbent may include a solvent at 40 to 95 wt % and a solute at 5 to 60 wt %, and more preferably, a solvent at 60 to 95 wt % and a solute at 5 to 30 wt %. Commonly used absorbents include water at 70 wt % and amines at 30 wt %, and KIERSOL also includes water at 74 wt % and a solvent at 26 wt %.

The additive may be further included at 1 wt % or less, and more preferably, at 0.1 to 0.5 wt %. The additive is added in an amount within a range in which a desired effect of an absorbent can be obtained.

In addition, the absorbent may be used as a solution in which the solvent, solute, and an additive are mixed.

Additionally, it is preferable that a solution in which the solvent, solute, and an additive are mixed be in a pH range of pH 2 to 12.

The absorption solution that has absorbed carbon dioxide, which is supplied to the absorption solution flow path, and the fluid solution which is supplied to the first flow path and the second flow path may be supplied alternately.

The absorption solution flow path and the fluid solution flow path may be formed to be in a combination of at least two flow paths, and the absorption solution that has absorbed carbon dioxide and the fluid solution may be supplied in parallel.

The absorption solution flow path and the fluid solution flow path may be formed to be in a combination of at least two flow paths, and the absorption solution that has absorbed carbon dioxide and the fluid solution may be supplied in series.

The absorption solution flow path and the fluid solution flow path may be formed to be in a combination of at least two flow paths, and the absorption solution that has absorbed carbon dioxide and the fluid solution may be supplied through a honeycomb structure.

The absorption solution that has absorbed carbon dioxide, which is supplied through the absorption solution flow path, may be an absorption solution that has or has not absorbed the carbon dioxide in the gas.

The absorption solution that has absorbed carbon dioxide and the fluid solution, which are supplied to the electricity-generating device using ion, may be supplied in counter-flow or parallel-flow directions.

A heat exchanger 5 in which heat is exchanged when the absorption solution which has absorbed carbon dioxide and the regenerated absorption solution which has passed through the electricity-generating device using ion pass through the heat exchanger may be further included.

The absorption solution that has absorbed carbon dioxide, which is supplied to the heat exchanger, may be supplied by a first liquid transfer pump 6a and the regenerated absorption solution which passes through the electricity-generating device using ion may be supplied by a second liquid transfer pump 6b.

The absorption tower may include a filler 1a which comes in contact with the gas, and the gas may be a mixed gas.

In addition, the present invention provides a carbon dioxide capturing process capable of producing electricity, which includes absorbing, by an absorbent, a gas including carbon dioxide through contact in an absorption tower; generating electricity by a potential difference generated by a concentration difference between an absorption solution that has absorbed carbon dioxide and a fluid solution in the electricity-generating device using ion including a fluid solution flow path containing a first flow path 7f and a second flow path 7g, through which the fluid solution moves, and an absorption solution flow path 7e through which the absorption solution that has absorbed carbon dioxide moves between the first flow path and the second flow path; and forming a closed loop through which a regenerated absorption solution moving through the absorption solution flow path and passing through the electricity-generating device using ion is supplied to the absorption tower by a liquid transfer pump 6.

Advantageous Effects

According to the present invention, carbon dioxide can be efficiently captured in places in which carbon dioxide is generated in large quantities to prevent global warming first, and additionally, carbon dioxide can be used as an energy source by producing electricity using an ion generating system, while a process can be continuously operated economically by regenerating an absorbent.

In this process, there are advantages in that no energy needs to be supplied from the outside to regenerate an absorbent during treatment of continuously captured greenhouse gases, costs of capturing carbon dioxide can be reduced due to the high carbon dioxide absorption speed, and process efficiency can be maintained in a normal state because phenomena in which salt is generated and layers separate do not occur and thus supplementation of an absorbent is not necessary.

In addition, in the present invention, electricity can be produced using a difference in concentration between a fluid solution and an absorption solution, and accordingly, the present invention can be utilized as a power storage apparatus in which a peak load can be reduced by generating electricity based on a difference in concentration when power consumption reaches its peak.

Therefore, the present invention is expected to contribute greatly to securing technology for reducing greenhouse gases in response to global warming and producing electricity when the present invention is applied to new absorbent processes for separating carbon dioxide from combustion exhaust gases at a low cost.

DESCRIPTION OF DRAWINGS

FIG. 1 is a configuration diagram of a carbon dioxide capturing apparatus capable of producing electricity according to the present invention.

FIG. 2 is a conceptual diagram of a carbon dioxide capturing apparatus capable of producing electricity according to the present invention.

FIG. 3 is a configuration diagram of a carbon dioxide capturing apparatus capable of producing electricity, which includes a heat exchanger, according to the present invention.

FIG. 4 shows results of power density and closed circuit voltage according to Embodiment 1.

FIG. 5 shows results of a change in pH of an absorption solution and a fluid solution according to Embodiment 1.

FIG. 6 shows results of changes in maximum energy, power density, closed circuit voltage, and pH according to Embodiment 2.

MODES OF THE INVENTION

Hereinafter, the exemplary embodiments of the present invention will be described with reference to the appended drawings. It should be noted that it is possible for the same components to have the same reference numerals even if they are shown in different drawings. Detailed descriptions of known functions and configurations determined to unnecessarily obscure the gist of the invention will be omitted.

The present invention is largely configured of two parts, an absorption tower in which carbon dioxide is selectively absorbed and an electricity-generating device using ion in which electricity is produced due to a difference in concentration between an absorption solution and a fluid solution, and a configuration diagram of this is shown in FIG. 1.

In addition, the present invention is largely configured of three parts, an absorption tower in which carbon dioxide is selectively absorbed, a heat exchanger in which heat is exchanged between an absorption solution that has absorbed carbon dioxide and a regenerated absorption solution passing through the electricity-generating device using ion, and the electricity-generating device using ion in which electricity is produced due to a difference in concentration between the absorption solution and a fluid solution, and a configuration diagram of this is shown in FIG. 3. Components of the present invention will now be described.

First, an absorption tower 1 will be described. The absorption tower according to the present invention is a device in which carbon dioxide from an exhaust gas 2 containing carbon dioxide is absorbed through contact, and is configured such that an absorption solution is supplied to an upper part of the absorption tower, and the absorption solution 4 that has absorbed carbon dioxide is transferred from a lower part of the absorption tower to a heat exchanger 5. The absorption tower may include a filler, and the absorption solution that has absorbed carbon dioxide may be transferred to the heat exchanger by a liquid transfer pump.

In the heat exchanger 5, heat is exchanged between the absorption solution that has absorbed carbon dioxide and a regenerated absorption solution passing through the electricity-generating device using ion. A fluid flowing into the heat exchanger is supplied in counter-flow or parallel-flow directions.

In the electricity-generating device using ion, as shown in FIG. 1, a space formed between a cation electrode 7c and an anion electrode 7d is divided by a cation exchange membrane 7a and an anion exchange membrane 7b. That is, the electricity-generating device using ion 7 is composed of a first flow path 7f between the cation exchange membrane 7a and the cation electrode 7c, a second flow path 7g between the anion exchange membrane 7b and the anion electrode 7d, and an absorption solution flow path 7e between the cation exchange membrane 7a and the anion exchange membrane 7b.

A fluid solution flows in the fluid solution flow path including the first flow path 7f and the second flow path 7g, and the absorption solution that has absorbed carbon dioxide flows in the absorption solution flow path 7e.

The cation exchange membrane 7a is a dense membrane that blocks the flow of an absorption solution and allows only cations to selectively pass through, and the anion exchange membrane 7b is a dense membrane that blocks the flow of an absorption solution and allows only anions to selectively pass through.

The fluid solution may include an aqueous electrolyte such as NaCl, $H_2SO_4$, HCl, NaOH, KOH, $NaNO_3$, and the like and an organic electrolyte such as propylene carbonate (PC), diethyl carbonate (DEC), or tetrahydrofuran (THF).

In particular, one or more solvents selected from among aqueous solvents such as pure water, freshwater, brackish water, saline water, or a mixed solvent of an alcohol and water, and organic solvents including aliphatic hydrocarbons such as hexane and the like; aromatic hydrocarbons such as benzene, toluene, xylene, methylnaphthalene and the like; heterocyclic compounds such as quinoline, pyridine and the like; ketones such as acetone, methyl ethyl ketone, cyclohexanone and the like; esters such as methyl acetate, methyl acrylate and the like; amines such as diethylenetriamine, N,N-dimethylaminopropylamine and the like; ethers such as diethyl ether, propylene oxide, tetrahydrofuran (THF) and the like; amides such as N-methylpyrrolidone (NMP), dimethylformamide, dimethylacetamide and the like; and polar aprotic solvents such as hexamethylphosphoramide, dimethyl sulfoxide and the like may be used as the fluid solution.

Also, the absorption solution may move along the absorption solution flow path 7e, and the absorbent may include one or more selected from among aqueous electrolytes such as amines, alkali metal bicarbonates, alkali carbonates, carbonates, hydroxides, borates, phosphates, nitrates, acids, and sodium chloride and organic electrolytes such as propylene carbonate (PC), diethyl carbonate (DEC), and tetrahydrofuran (THF).

The amines may be primary amines, secondary amines, or ammonia. The amines may be liquid or solid at room temperature and atmospheric pressure, or may be gases with vapor pressure or in a mist-phase. Primary amines may be saturated aliphatic primary amines such as methylamine, ethylamine, isopropylamine, propylamine, butylamine, 2-aminoethanol and the like, unsaturated aliphatic primary amines such as allylamine and the like, alicyclic primary amines such as cyclopropylamine and the like, and aromatic primary amines such as aniline and the like. Secondary amines may be saturated aliphatic secondary amines such as dimethylamine, diethylamine, diisopropylamine and the like, unsaturated aliphatic secondary amines such as diallylamine and the like, and aromatic secondary amines such as methylaniline and the like.

Also, the amines may be ethyleneamine, ethanolamine (MEA), N—N-butylethanolamine (BEA), ethylenediamine (EDA), diethanolamine (DEA), diisopropanolamine (DIPA), N-methyldiethanolamine (MDEA), diglycolamine (DGA), triethanolamine (TEA), o-methylhydroxylamine, ethanimidamine, N-(2-hydroxyethyl)ethylenediamine (AEEA), diethanoltriamine (DETA), N,N-dimethylethlethanolamine (DMMEA), 2-4n diisopropanolamine or 2n methyldiethanolamine (ADIP), piperidine, piperazine, morpholine, pyrrolidine, 2,2,6,6-tetramethyl-4-piperidinol (TMP), 2-amino-2-methylpropanol (AMP), 1-amino-2-propanol (MIPA), 2-methylaminoethanol (MMEA), 3-amino-1-propanol (MPA), diethylaminoethanol (DEMEA), 2-diisopropylaminoethanol (DIPMEA), 2-diethylaminoethanol (DEAE), 2-(diisopropylamino)ethanol (DIPAE), 2-(dimethylamino)-2-methylpropanol (DMAMP), N-ethyldiethanolamine (EDEA), N-isopropyldiethanolamine (IPDEA), N-tert-butyldiethanolamine (tBDEA), 1-(2-hydroxyethyl)pyrrolidine (HEP), 1-(2-hydroxyethyl)piperidine (HEPD), 1-methyl-2-piperidineethanol (1M-2PPE), 1-ethyl-3-hydroxypiperidine (1E-3HPP), 2-{[2-(dimethylamino)ethyl]methylamino}ethanol (DMAEMAE), N,N,N',N'-tetrakis(2-hydroxyethyl)ethylenediamine (TKHEEDA), 2-[2-(dimethylamino)ethoxy]ethanol (DMAEE), bis[2-(N,N-dimethylamino)ethyl]ether (DAEE), 1,4-dimethylpiperazine (DMPZ), N,N,N',N",N"-pentamethyldiethylenetriamine (PMDETA), N-methyl-N,N-bis[3-(dimethylamino)propyl]amine (PMDPTA), n-butyl di ethanol amine (BDEA), triisopropanolamine (TIPA), 4-(2-hydroxyethyl)morpholine (HEM), hydroxyisopropylmorpholine(N-(2-hydroxypropyl)morpholine) (HIPM), (2-(dibutylamino)ethanol (2-DBAE), 2,2-bis(hydroxymethyl)-2,2'2"-nitrilotriethanol (HMNTE), N-methyl-4-piperidinol (MP), hexamethylenetetramine (HMTA), N,N-dicyclohexylmethylamine (DCHMA) and the like.

In addition, the amines may be the sterically hindered amines KS-1, KS-2, and KS-3. Also, sterically hindered cyclic amines may include 1-amino-4-methylpiperazine, 1-(2-aminoethyl)-4-methylpiperazine, 1-(2-hydroxyethyl)-4-methylpiperazine, 1-(2-aminoethyl)piperazine, 1-(2-hydroxyethyl)piperazine, 2-aminoethylpiperazine, 1-ethylpiperazine, 2,5-dimethylpiperazine, cis-2,6-dimethylpiperazine, 1,4-dimethylpiperazine, trans-2,5-dimethylpiperazine, 1-methylpiperazine, 2-methylpiperazine, 1-ethylpiperazine, 2-piperidineethanol, 3-piperidineethanol, 4-piperidineethanol, 2-aminoethyl-1-piperidine, homopiperazine, and the like.

The alkali carbonates may include potassium carbonate ($K_2CO_3$), sodium carbonate ($Na_2CO_3$), sodium hydroxide (NaOH), potassium hydroxide (KOH), potassium bicarbonate ($KHCO_3$), sodium bicarbonate ($NaHCO_3$), and the like. Also, the alkali carbonates may include compounds from the Benfield process developed by Union Carbide Corporation, the HIPure process known as the improved Benfield process, the Catacarb process developed by A. G. Eickmeyer, FLEX-SORB HP developed by Exxon mobil Corporation, etc.

In addition, the nitrate may be sodium nitrate ($NaNO_3$). Also, the acid may be sulfuric acid ($H_2SO_4$) or hydrochloric acid (HCl).

In particular, the absorption solution may also include aqueous electrolytes such as NaCl, $H_2SO_4$, HCl, NaOH, KOH, $NaNO_3$, and the like, and organic electrolytes such as propylene carbonate (PC), diethyl carbonate (DEC), and tetrahydrofuran (THF), which is similar to the fluid solution.

Particularly, one or more solvents selected from among aqueous solvents such as pure water, freshwater, brackish water, saline water, or a mixed solvent of an alcohol and water, or organic solvents including as aliphatic hydrocarbons such as hexane and the like; aromatic hydrocarbons such as benzene, toluene, xylene, methylnaphthalene and the like; heterocyclic compounds such as quinoline, pyridine and the like; ketones such as acetone, methyl ethyl ketone, cyclohexanone and the like; esters such as methyl acetate, methyl acrylate and the like; amines such as diethylenetriamine, N,N-dimethylaminopropylamine and the like; ethers such as diethyl ether, propylene oxide, tetrahydrofuran (THF) and the like; amides such as N-methylpyrrolidone (NMP), dimethylformamide, dimethylacetamide and the like; and polar aprotic solvents such as hexamethylphosphoramide, dimethyl sulfoxide and the like may be used as the absorption solution.

The absorption solution and the fluid solution may be supplied in counter-flow or parallel-flow directions.

The cation electrode 7c, the anion electrode 7d, the cation exchange membrane 7a and the anion exchange membrane 7b are not limited as long as they are used for a conventional fluidized-bed electrode system (battery, storage battery, etc.), and those appropriately selected by those skilled in the art based on the purpose of use and conditions can be used.

Next, embodiments of the present invention using the carbon dioxide capturing apparatus capable of producing electricity will be described.

In FIG. 3, reference numbers 1, 5, and 7 refer to an absorption tower 1, a heat exchanger 5, and an electricity-generating device using ion 7, respectively.

The absorption tower 1 may include a flow path 2 for an exhaust gas containing carbon dioxide, a flow path 3 for an exhaust gas passing through the absorption tower, a flow path 10 for supplying a regenerated absorption solution passing through the heat exchanger 5 to the absorption tower, a flow path 4 for discharging an absorption solution that has absorbed carbon dioxide into a lower part of the absorption tower, a filler 1a that comes in contact with gas in the absorption tower, and a first liquid transfer pump 6a through which the absorption solution that has absorbed carbon dioxide is transferred to the heat exchanger.

In the heat exchanger 5, heat is exchanged when the absorption solution that has absorbed carbon dioxide and the regenerated absorption solution which has passed through the electricity-generating device using ion pass through the heat exchanger.

In the electricity-generating device using ion 7, a space formed between a cation electrode 7c and an anion electrode 7d is divided by a cation exchange membrane 7a and an anion exchange membrane 7b. That is, the electricity-generating device using ion 7 includes a first flow path 7f between the cation exchange membrane 7a and the cation electrode 7c, a second flow path 7g between the anion exchange membrane 7b and the anion electrode 7d, and an absorption solution flow path 7e between the cation exchange membrane 7a and the anion exchange membrane 7b.

In the absorption tower 1, an absorption solution having a higher concentration than a fluid solution flowing in the first flow path 7f and the second flow path 7g is supplied to the absorption solution flow path 7e of the electricity-generating device using ion, or an absorption solution having a lower concentration than a fluid solution flowing in the first flow path 7f and the second flow path 7g is supplied to the absorption solution flow path 7e of the electricity-generating device using ion. Therefore, an ion concentration of the absorption solution passing through the absorption solution flow path 7e may increase or decrease.

Then, an ammeter 8 configured to measure electric energy is connected with the electricity-generating device using ion, and thus may measure a potential difference generated by the difference in concentration in an ion generating cell.

Therefore, when the absorption solution having the relatively high concentration and the fluid solution having the relatively low concentration are supplied to the electricity-generating device using ion, cations and anions move toward the absorption solution from the first flow path 7f and the second flow path 7g having a low concentration to the cation electrode 7c and the anion electrode 7d through the cation exchange membrane 7a and the anion exchange membrane 7b, so that a potential difference is generated by the moving cations and anions.

On the other hand, when the absorption solution having the relatively low concentration and the fluid solution having the relatively high concentration are supplied to the electricity-generating device using ion, cations and anions move toward the absorption solution from the first flow path 7f and the second flow path 7g having a high concentration to the cation electrode 7c and the anion electrode 7d through the cation exchange membrane 7a and the anion exchange membrane 7b, so that a potential difference is generated.

A conceptual diagram of the present invention is shown in FIG. 2. An absorption process of the present invention operates in a temperature range of 5 to 80° C., a pressure range of atmospheric pressure to 20 atm and a range of a molar flux ratio (liquid/gas) of 2.0 to 10. An ion exchange membrane process of an generating device using ion of the present invention also operates in a temperature range of 5 to 80° C., a pressure range of atmospheric pressure to 20 atm and a range of a volumetric flow ratio (saline water:freshwater:electrolyte) of 2:1.0 to 2.0:2. Two effects of reducing greenhouse gases by removing carbon dioxide from exhaust gases and of producing electricity by inputting an absorbent which absorbs carbon dioxide to an generating device using ion which uses a difference in concentration to generate a potential difference can be obtained based on the concept that a gas including carbon dioxide is absorbed by an absorption solution in an absorption tower, the absorption solution which has a high concentration and has absorbed carbon dioxide and freshwater which has a low concentration are supplied to an generating device using ion which utilizes the difference in concentration, and then electricity is produced by generating the potential difference in the electricity-generating device using ion in which only ions selectively permeate.

Embodiment 1

In Embodiment 1 of the present invention, a carbon dioxide absorbing apparatus that is capable of producing electricity and is configured of five pairs of a cation exchange membrane (developed by Fumatech and Astom Corporation) and an anion exchange membrane (developed by Fumatech) between rectangular positive and negative electrodes (graphite electrodes) having a micro-flow path, a spacer, an absorption solution (KIERSOL: mixture of 15 wt % $K_2CO_3$, 10 wt % 2-methylpiperazine, and water), a vessel with a stirrer through which carbon dioxide is reacted (10 mL/min, 200 rpm, 40° C.), a vessel for inputting freshwater (10 mL/min) and a vessel for circulating an electrolyte (a mixed solution of ferrocyanide and NaCl:$Fe(CN)_6^{3-/4-}$ 50 mM, 20 mL/min), was manufactured.

The total energy generated was 0.05 W, voltage was 0.5 to 0.54 V, and the maximum power density per unit area of an exchange membrane was 0.8 W/m². FIG. 4 illustrates values of power density and closed circuit voltage based on reaction time. It can be seen that the power density values were 0.7 to 0.8 W/m² within a measured amount of time. Generated energy per unit cell when KIERSOL was used as an absorbent was 300 kJ/(ton of KIERSOL).

As shown in FIG. 5, it can be seen that a pH of freshwater passing through an ion reactor decreased to pH 7.2 from pH 8.0 before passing through the ion reactor, and a pH of the absorbent KIERSOL increased to pH 8.4 from pH 7.9 before passing through the ion reactor. $HCO_3^-$ and $H^+$ ions were transferred through an ion exchange membrane, and as a result, an absorption solution was regenerated into a base solution and a fluid solution was regenerated into an acidic solution.

Embodiment 2

Upon reviewing FIG. 6, experimental results of a carbon dioxide capturing apparatus capable of producing electricity can be confirmed. An experiment was performed using a selective ion exchange membrane (0.0071 m²) developed by Fumatech, a graphite electrode, five stacks of cation and anion exchange membranes, a spacer (0.2 mm), saline water (10 mL/min), freshwater (5 mL/min), and an electrolyte (10 mL/min).

In the case of a KIERSOL solution, voltage was 0.3 to 0.4 V, and a power density value was 0.3 to 0.4 W/m². In the case of a KIERSOL solution that had absorbed carbon dioxide, voltage was 0.5 V, and a power density value was 0.7 to 0.8 W/m².

While the present invention has been described with reference to the exemplary embodiments of the present invention, it may be understood by those skilled in the art that various modifications and alterations may be made without departing from the spirit and scope of the present invention described in the appended claims.

The invention claimed is:

1. A carbon dioxide capturing apparatus capable of producing electricity, comprising:
    an absorption tower in which a gas including carbon dioxide comes in contact with an absorbent and is absorbed by the absorbent, the absorption tower comprising a flow path for discharging an absorption solution that has absorbed carbon dioxide;
    an electricity-generating device including:
        a space formed between a cation electrode and an anion electrode the space including a fluid solution flow path through which a fluid solution moves comprising a first flow path formed by a cation exchange membrane spaced apart from the cation electrode and a second flow path formed by an anion exchange membrane spaced apart from the anion electrode, and an absorption solution flow path connected to the flow path of the absorption tower between the first flow path and the second flow path to be supplied with the absorption solution that has absorbed carbon dioxide discharged from the absorption tower,
    a heat exchanger in which the absorption solution that has absorbed carbon dioxide discharged from the absorption tower and a regenerated absorption solution passing through the electricity-generating device are heat-exchanged;
    a first liquid transfer pump for supplying the absorption solution that has absorbed carbon dioxide discharged from the absorption tower through the heat exchanger to the absorption solution flow path; and
    a second liquid transfer pump for supplying the regenerated absorption solution passing through the electricity-generating device through the heat exchanger to the absorption tower;
        wherein the cation exchange membrane is a membrane that allows only cations to selectively pass through, and the anion exchange membrane is a membrane that allows only anions to selectively pass through, and
        wherein when the absorption solution has a relatively higher concentration than the fluid solution or the absorption solution has a relatively lower concentration than the fluid solution, the absorption solution is supplied from the absorption tower to the absorption solution flow path of the electricity-generating device and the fluid solution is supplied to the fluid solution flow path, such that a cation passes through the cation exchange membrane and an anion passes through the anion exchange membrane due to the difference in concentration between the fluid solution and the absorption solution having absorbed carbon dioxide, so that electricity is generated by a potential difference by moving cations and anions at the electricity-generating device.

2. The carbon dioxide capturing apparatus capable of producing electricity according to claim 1, wherein the absorbent includes, as a solute, one or more selected from an aqueous electrolyte group consisting of amines, alkali metal bicarbonates, alkali carbonates, carbonates, hydroxides, borates, phosphates, nitrates, acids, and sodium chloride and an organic electrolyte group consisting of propylene carbonate (PC), diethyl carbonate (DEC), and tetrahydrofuran (THF).

3. The carbon dioxide capturing apparatus capable of producing electricity according to claim 1, wherein the absorbent further includes, as an additive, a corrosion inhibitor, a coagulant aid, an antioxidant, an oxygen scavenger, an antifoaming agent, or a combination thereof.

4. The carbon dioxide capturing apparatus capable of producing electricity according to claim 1,
    wherein the absorbent includes, as a solvent, one or more materials selected from the group consisting of an aqueous solvent group and an organic solvent group,
    wherein the aqueous solvent group includes a solvent selected from the group consisting of pure water, freshwater, brackish water, saline water, and a mixed solvent of an alcohol and water, and
    wherein the organic solvent group includes an aliphatic hydrocarbon group consisting of hexane; an aromatic hydrocarbon group consisting of benzene, toluene, xylene, and methylnaphthalene; a heterocyclic compound group consisting of quinoline and pyridine; a ketone group consisting of acetone, methyl ethyl ketone, and cyclohexanone; an ester group consisting of methyl acetate and methyl acrylate; an amine group consisting of diethylenetriamine and N,N-dimethylaminopropylamine; an ether group consisting of diethyl ether, propylene oxide, and tetrahydrofuran (THF); an amide group consisting of N-methylpyrrolidone (NMP), dimethylformamide, and dimethylacetamide; and a polar aprotic solvent group consisting of hexamethylphosphoramide and dimethyl sulfoxide.

5. The carbon dioxide capturing apparatus capable of producing electricity according to claim 1, wherein the absorption solution that has absorbed carbon dioxide, which is supplied to the absorption solution flow path, and the fluid solution supplied to the first flow path and the second flow path are supplied alternately.

6. The carbon dioxide capturing apparatus capable of producing electricity according to claim 1, wherein the absorption solution that has absorbed carbon dioxide and the fluid solution are supplied in parallel.

* * * * *